Figure 3:
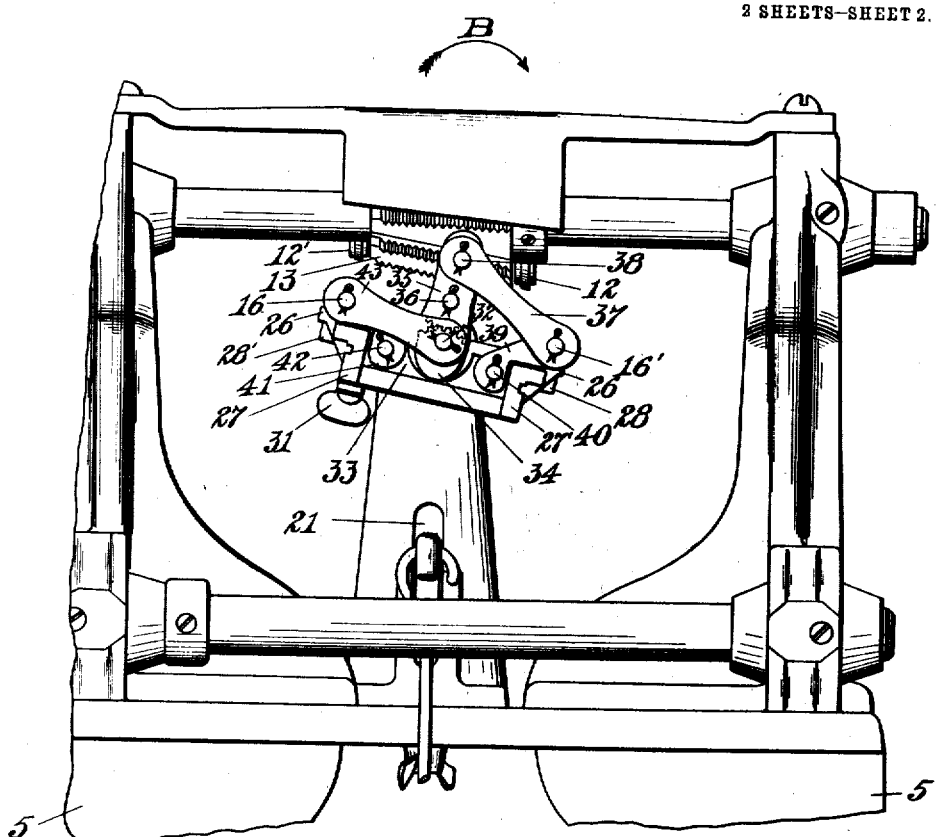

E. BAYARD.
MACHINE FOR SCORING LEATHER.
APPLICATION FILED MAY 22, 1907.
1,122,245.
Patented Dec. 29, 1914.
2 SHEETS—SHEET 1.
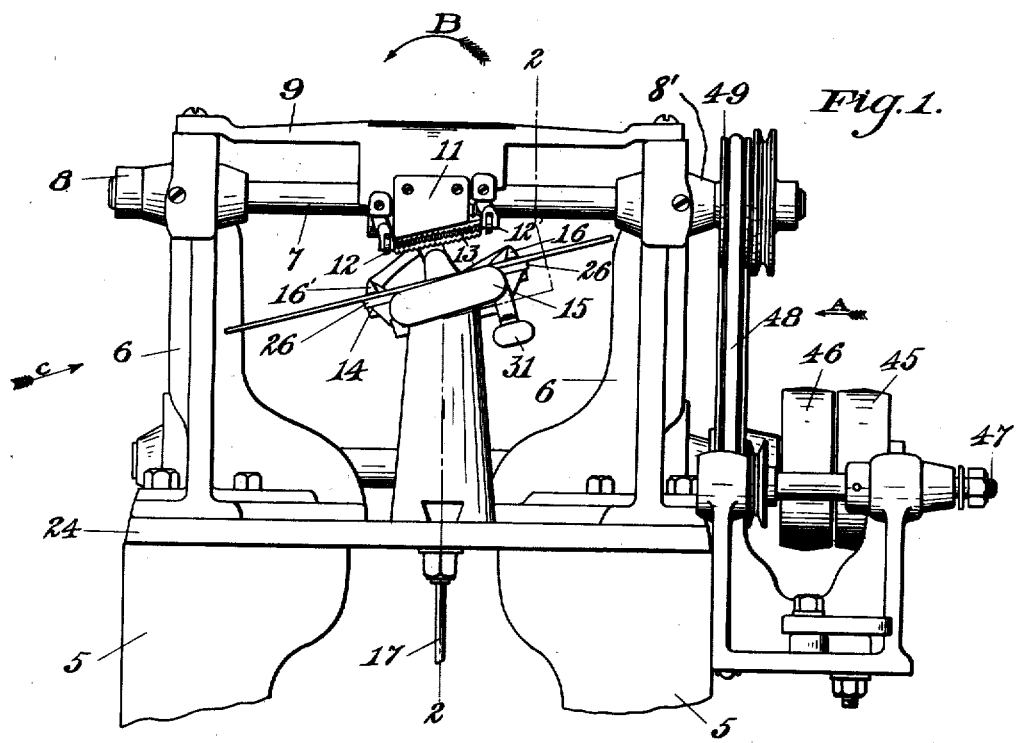
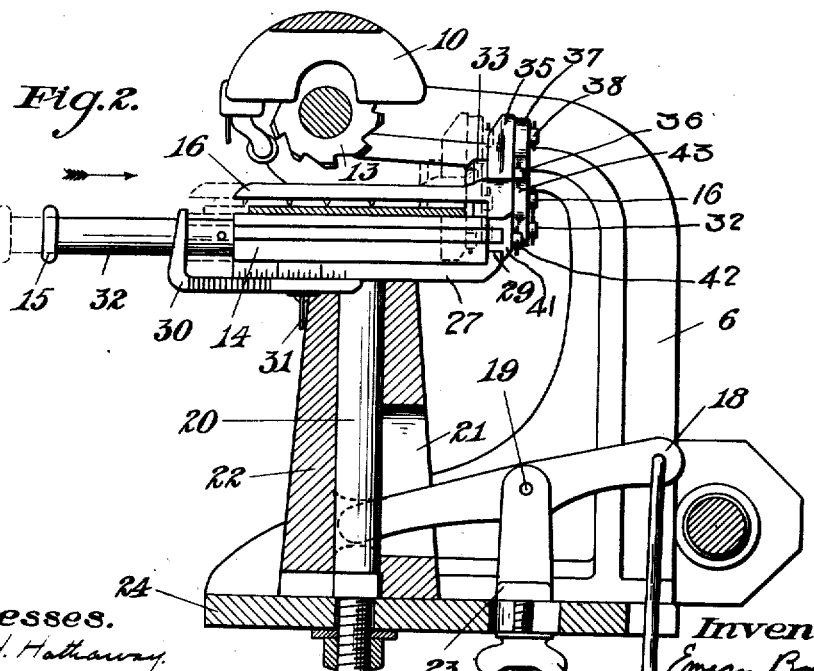
Witnesses.
Bertha H. Hathaway.
Elizabeth C. Coupe
Inventor.
Emery Bayard

E. BAYARD.
MACHINE FOR SCORING LEATHER.
APPLICATION FILED MAY 22, 1907.

1,122,245.

Patented Dec. 29, 1914.
2 SHEETS—SHEET 2.

Witnesses.

Inventor.

UNITED STATES PATENT OFFICE.

EMERY BAYARD, OF ROCHESTER, NEW YORK, ASSIGNOR TO UNITED SHOE MACHINERY COMPANY, OF PATERSON, NEW JERSEY, A CORPORATION OF NEW JERSEY.

MACHINE FOR SCORING LEATHER.

1,122,245.  Specification of Letters Patent.  Patented Dec. 29, 1914.

Application filed May 22, 1907. Serial No. 363,797.

*To all whom it may concern:*

Be it known that I, EMERY BAYARD, a citizen of the United States, residing at Rochester, in the county of Monroe and State of New York, have invented certain Improvements in Machines for Scoring Leather, of which the following description, in connection with the accompanying drawings, is a specification, like reference characters on the drawings indicating like parts in the several figures.

This invention relates to machines for scoring leather or other material in order to make it flexible, but more especially to scoring insoles for boots and shoes.

In using the machines heretofore known, a difficulty is experienced in gaging the length of the scores in order to cover the space between the channels in which the sole is sewed to the upper but without damaging the lips thereon.

A feature of the present invention consists in the combination of a relatively movable scoring cutter, and work support constructed and arranged to enable the scores to be terminated at each end within the margin of the piece of work being scored. Preferably adjustable stops are provided for the moving member by which the location of the scores with relation to the edges of the work can be predetermined. In the preferred embodiment of this feature of the invention, the material to be scored is placed upon a work supporting table and held by means of clamps, operated by a handle in front of the same in connection with certain link motions. The table is then raised by means of a treadle connected to a lever pivoted upon the support and to the movable shaft upon which the supporting table is placed until the material comes sufficiently in contact with a rotary cutter set upon a horizontal shaft, after which the work is fed under the cutter a sufficient distance to form the scores of desired length. Stops are provided for limiting the feeding movements. Adjacent to the cutter are located other stops, which are preferably rollers, to prevent the work being pressed too hard against the cutter. This work supporting table is set parallel to the under surface of the cutter and consists of two parts, a fixed base or track with adjustable stops thereon and a movable portion which operates on said track and is regulated by the stops.

A further feature of the invention consists in a novel construction and relative arrangement of the cutter and work support to facilitate the insertion and withdrawal of the work.

It is desirable to employ a rotary cutter of such diameter that the maximum depth of the scores will be maintained close to their ends. In the use of a machine having such a cutter the space between the shaft and the work support is so small as to render it somewhat difficult to insert the work. To overcome this difficulty a rotary cutter of conical form is preferably employed and a work support having a work sustaining surface parallel to the acting face of the cutter will advantageously be arranged to permit the insertion of the work from the end adjacent to the larger end of the cutter and in a direction inclined toward the shaft. By this arrangement accidental engagement of the operator's hand with the rotating shaft is not liable to occur.

Another feature of this invention is the form of clamping arm which is preferably attached at its rear end only to its operating means, thus allowing the work to be inserted upon the table from the front or side.

Figure 4:
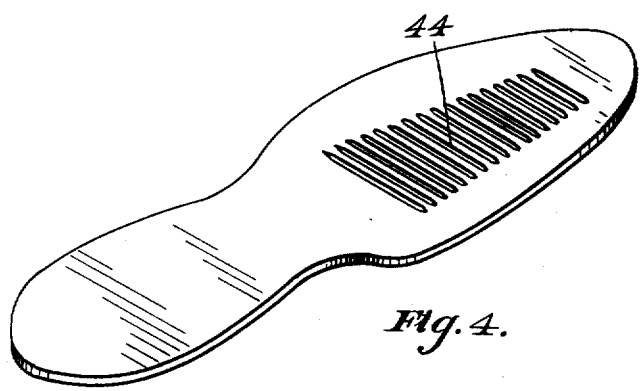

In the drawings:—Figure 1 is a front elevation of the device with the treadle and a portion of the base removed. Fig. 2 is a vertical, sectional view on a line 2—2 of Fig. 1 looking in the direction of the arrow A in this figure with all parts in front of the section removed. Fig. 3 is a rear elevation corresponding to Fig. 1 and with a portion of the frame, upon which is the transmission, removed. Fig. 4 shows an insole as scored by the device.

Referring to the drawings, in which is illustrated one construction embodying the several features of the invention, 5 is the support or bed-plate upon which is placed and fastened thereto, a frame 6 to support the cutter shaft 7 operating in journal boxes 8, 8' in said frame. This frame is best shown in Fig. 2 and is constructed so as not to interfere with the work. The brace 9 connects the two arms of the frame and upon this is cast a shield 10 to protect the operator. To this shield is attached a plate 11 for the same purpose and two rollers 12, 12' to prevent the work being driven too hard against the cutter. The cutter 13 is mounted upon the shaft about midway between the two journal boxes and is shaped as a frustum of a cone with its axis coinciding with the axis of the shaft and the plane of the top of the frustum being perpendicular to the axis. The axial length of the cutter varies, depending upon the extent of the sole it is desired to score. The teeth of the cutter are set in longitudinal rows, said rows being equiangular with each other. The lever 18 passes through an opening 21 in the support 22 of the table 14 and enters a recess in the shaft 20 within which it acts to raise the table as described. The lever 18 is fulcrumed at 19 to the post 23 set upon the bed-plate 24 and is made adjustable by the screw 25, upon which is a hand nut 56 and by means of which the amount which the work supporting table may be raised or lowered is regulated.

The table 14 is mounted upon the shaft 20 and supports a feed carrier consisting of a flat plate 26, resting upon two L shaped rails 27, 27' and held to them by downwardly extending flanges 28, 28', respectively, on each side of the plate to prevent it from coming off and yet allow freedom of movement forward or back. At the rear end of the rail 27, is cast a stop 29 to prevent the movable plate 26 going too far in that direction and on the forward end is an adjustable stop to regulate the advance of the same. This runs in a groove on the under side of the rail and is regulated by the thumb screw 31. One side of this stop is scaled so that it may be set for any predetermined length of scores.

The forward edge of the movable plate is flush with the end of the rail when the former is in its rearward position, as is shown in Fig. 2, so that if the adjustable stop 30 is set at any point on its scale, the distance which the movable plate can advance is that from the forward end of the rail to the face of the stop 30, this being the length of score. The extended position of handle and movable plate is shown by dotted lines in Fig. 2. Clamps 16 and 16' are provided to coöperate with the plate 26 to hold the work to be scored upon said plate. The clamps are arranged to be simultaneously raised and lowered relatively to the plate 26 by means of a slight turning of the rod 32 as will now be described. The handle 15 is upon the rod 32, which is rotatably attached to the movable feed carrier 26 on the table 14, and is the means for reciprocating said feed carrier under the cutter. This rod 32 passes through the upwardly extending portion of the flange 33 on the rear edge of the movable plate 26 and upon its rearwardly extending portion is fastened a gear to operate the link motion connected with the clamp 16', already referred to. This gear coöperates with teeth upon the link 35 pivoted to the flange 33 at 36 and to the link 37 at 38. This link 37 is pivoted to link 39 by the clamp bar 16', which is rigidly fixed to said link 39, but its rearwardly extending portion acts as a pivot for 37, and the link 39 is in turn pivoted at 40 to the flange 33, so that when the handle 15 is turned in the direction of the arrow B, the pivot 38 travels in the opposite direction, causing the link 39 to revolve on pivot 40 and thus raise the clamp 16'. The clamp 16 is attached to link 41 pivoted to flange 33 at 42 and upon the rearwardly extending portion of said clamp is pivoted link 43, which is connected to the link 35 as shown so that when the handle is turned in the direction of arrow B, the link 43 revolves in the same direction and raises clamp 16, revolving on link 41.

In Fig. 4, 44 is a set of scores as formed by the cutter 13 upon an insole.

A practical arrangement for power transmission is shown in Fig. 1; 45 and 46 being the fixed and loose pulleys, respectively; 47, a shaft rotatably attached to the frame and 48, a round belt connecting said shaft and pulley wheel 49 on cutter shaft 7. Before placing the work to be scored upon the feed carrier, the handle 15 should be turned in the direction of arrow B in Fig. 1, which acts through the link motion previously described, to raise the two clamps 16, 16'. With the handle in this position, the sole to be scored may be inserted in the direction of the arrow C in Fig. 1 and when in place, the handle should be turned in the opposite direction until the teeth on the under surface of the clamps have taken a firm hold on the sole. The treadle attached to the rod 17 should now be depressed, thus pulling down said rod, which is connected to a bar 18 pivoted at 19, forming a lever to raise with its other end, the shaft 20 upon which the work supporting table is mounted. The treadle is depressed until the work is brought into engagement with the rotary cutter 13 to cut the scores in the work, and the operator may then reciprocate the plate 26, sliding it upon the rails 27, 27' between the stops 29 and 30, by means of the handle 15 and rod 32, and thus give the desired length to the scores. When pressure on the treadle is released the table 14 drops downwardly by its own weight, thus withdrawing the work from the cutter 13. The clamps 16 and 16' may then be raised and the work be removed from the machine. By reason of the conical form of the rotary cutter it will be obvious that the incisions made by different teeth of the cutter will be of different lengths and the scored or incised area of the sole will be wider at the large end of the cutter than at the small end thereof. By inserting the sole in the direction indicated by the arrow C in Fig. 1, as described, the narrower portion of the incised area will occur near the toe, the width of said area increasing rearwardly toward the wider ball portion of the sole where the lengths of the incisions may be greater, while still keeping within the channel lip.

Having described my invention, what I claim as new and desire to secure by Letters Patent of the United States is:—

1. A machine for scoring leather, comprising the combination with a rotary, conical, cutter, and a scoring table mounted upon a support, of means for feeding material to said cutter and means for regulating the feeding movement.

2. In a machine for scoring leather, the combination with a rotary, conical, cutter, and a table mounted upon a support, of a feed carrier movable upon the table and a scaled gage mounted upon said table for regulating the movement of said feed carrier.

3. A machine for scoring leather, comprising the combination with a rotary, conical, cutter, and a scoring table mounted upon a support, of means for feeding material to the cutter and means for regulating the length of the scores formed by the cutter.

4. In a machine for scoring leather, the combination with a cutter of means to move relatively the cutter and the work to form scores, means to move the work to lengthen the scores, and means to permit the scores to be terminated within the margin of the work.

5. A machine for scoring leather, comprising the combination with a rotary, conical, scoring cutter, and a table mounted upon a support, of a movable feed carrier upon said table, clamping arms pivotally mounted thereon, and means connected thereto for operating said clamping arms.

6. In a machine for scoring leather, the combination with a cutter, and a table, of a movable feed carrier upon said table movable relatively to the cutter to present different portions of the work successively to the action of the cutter, and clamping means upon said feed carrier, constructed and arranged to allow the material to be scored to be inserted thereunder from three sides of said carrier.

7. In a machine for scoring leather, the combination with a cutter, and a table mounted upon a support, of a movable feed carrier upon said table and clamping arms pivoted upon the rear of said feed carrier, constructed and arranged to allow the material to be scored to be inserted thereunder from three sides of said feed carrier.

8. In a machine for scoring leather, the combination of a rotary, conical cutter upon a shaft, a table having a feed carrier thereon, arms mounted upon said carrier to clamp the material, a treadle to move said material into engagement with the cutter, and a handle attached to said carrier whereby it may be moved forward and back under the cutter.

9. In a machine for scoring leather, the combination of a rotary, conical cutter, a table mounted upon a support, and a feed carrier upon said table, of clamping arms attached to said carrier, and a handle arranged to operate both said clamping arms simultaneously.

10. In a machine for scoring leather, the combination with a cutter, of work supporting means movable toward and from the cutter for presenting and withdrawing the work and movable relatively to the cutter for feeding the work in the direction of the scores to be formed, and adjustable means to limit the length of the scores within the margins of the work.

11. In a machine for scoring insoles, the combination with a cutter, of work supporting means movable toward and from the cutter for presenting and withdrawing the insoles and movable relatively to the cutter for feeding the insoles in the direction of the scores to be formed, said parts being constructed and arranged to permit the scores to be terminated within the margins of the insoles, and adjustable stops for regulating the location of the scores relative to the edges of the insoles.

12. In a machine for scoring leather, the combination with a conical cutter, of a work supporting table having its work sustaining face parallel with the acting face of the conical cutter, and means coöperating with the table to clamp the work thereon, said means being constructed and arranged to permit the insertion of the work lengthwise of the axis of the cutter.

13. In a machine of the class described, the combination with a rotary shaft and bearings therefor, of a conical cutter arranged on the shaft between said bearings, work holding means movable toward and from the cutter and constructed and arranged to permit the work to be inserted therein from the end farther from the cutter shaft.

14. A leather scoring machine, comprising the combination with a rotary conical scoring cutter, of a work support movable under the cutter for feeding the work relatively thereto, and toothed clamping jaws for holding the work against displacement on the support.

15. In a machine of the class described, a cutter, means to hold and to feed an insole, mechanism to move relatively said cutter and the insole to form scores in the insole, means to move the work to lengthen the scores, and means to limit the extent of such movement.

16. A machine of the class described, having, in combination, means for making in a sole a plurality of incisions of different lengths, means permitting movement of the sole longitudinally of said incisions, and means for adjustably determining the extent of such movement.

17. In a machine of the class described, the combination of means for rendering a sole flexible by making a plurality of incisions a predetermined distance apart therein, said incisions extending transversely of the sole, means for moving the sole longitudinally of said incisions, and means for variably determining the length of an incision.

In testimony whereof I have signed my name to this specification in the presence of two subscribing witnesses.

EMERY BAYARD.

Witnesses:
THOMAS PIERCE,
GEORGE CLARK.

It is hereby certified that in Letters Patent No. 1,122,245, granted December 29, 1914, upon the application of Emery Bayard, of Rochester, New York, for an improvement in "Machines for Scoring Leather," errors appear in the printed specification requiring correction as follows: Page 1, line 45, after the word "form" strike out the article "the"; same page, same line, before the word "desired" insert the article *the;* page 3, lines 16 and 29, before the word "cutter" insert the word *scoring;* same page, same lines, before the word "table" strike out the word "scoring"; and that the said Letters Patent should be read with these corrections therein that the same may conform to the record of the case in the Patent Office.

Signed and sealed this 8th day of June, A. D., 1915.

[SEAL.]

R. F. WHITEHEAD,
*Acting Commissioner of Patents.*